(12) United States Patent
Lakner et al.

(10) Patent No.: US 7,253,379 B2
(45) Date of Patent: Aug. 7, 2007

(54) HIGH VOLTAGE CIRCUIT BREAKER WITH COOLING

(75) Inventors: Martin Lakner, Gebenstorf (CH); Daniel Chartouni, Baden (CH); Jean-Claude Mauroux, Hunzenschwil (CH); Thomas Schoenemann, Schafisheim (CH); Jochen Kiefer, Nussbaumen (CH); Lukas Zehnder, Baden-Daettwil (CH); Marc Mollenkopf, Schoenenwerd (CH)

(73) Assignee: ABB Research Ltd., Zurich (CH)

( * ) Notice: Subject to any disclaimer, the term of this patent is extended or adjusted under 35 U.S.C. 154(b) by 0 days.

(21) Appl. No.: 11/265,196

(22) Filed: Nov. 3, 2005

(65) Prior Publication Data

US 2006/0102618 A1    May 18, 2006

(30) Foreign Application Priority Data

Nov. 16, 2004    (EP)    ................................ 04405704

(51) Int. Cl.
  *H05B 1/02*    (2006.01)
(52) U.S. Cl. .................. 219/494; 219/491; 219/493; 174/16.1; 165/240
(58) Field of Classification Search ................ 219/494, 219/501, 490–493; 200/144 B, 166 K; 165/105, 165/240; 174/15 C, 16, 16 B, 15, 2, 16.1
See application file for complete search history.

(56) References Cited

U.S. PATENT DOCUMENTS

| | | | | |
|---|---|---|---|---|
| 3,609,206 A | * | 9/1971 | McConnell | 174/15.6 |
| 3,769,551 A | * | 10/1973 | Corman et al. | 361/676 |
| 4,005,297 A | * | 1/1977 | Cleaveland | 218/118 |
| 4,539,432 A | * | 9/1985 | Koppl et al. | 174/15.6 |
| 4,650,939 A | * | 3/1987 | Milianowicz | 218/118 |
| 6,492,609 B1 | | 12/2002 | Biquez et al. | |
| 6,766,817 B2 | | 7/2004 | da Silva | |
| 2003/0160844 A1 | | 8/2003 | Silva | |
| 2004/0237529 A1 | | 12/2004 | da Silva | |

FOREIGN PATENT DOCUMENTS

| | | |
|---|---|---|
| DE | 2 051 150 | 4/1972 |
| DE | 27 07 206 | 8/1978 |
| DE | 101 09 722 A1 | 9/2002 |
| EP | 1 022 830 A1 | 7/2000 |
| GB | 1162339 | 8/1969 |

* cited by examiner

*Primary Examiner*—Mark Paschall
(74) *Attorney, Agent, or Firm*—Buchanan Ingersoll & Rooney PC

(57) ABSTRACT

In order to dissipate heat losses from the inner conductor (21), the circuit breaker (20) having an elongated inner conductor (21) and an outer conductor (22) which surrounds the inner conductor (21) like a housing has at least one heat pipe (1) which extends from the inner conductor (21) to the outer conductor (22) and has an insulating hollow body (5) in order to form an electrical insulating gap (7). The heat pipe (1) advantageously has a flexibly deformable section (9). The heat pipe (1) can run in a supporting insulator (24) which supports the inner conductor (21). In addition to a working medium, the heat pipe (1) advantageously also contains an auxiliary gas which results in an enhanced dielectric strength at low temperatures.

28 Claims, 3 Drawing Sheets

HIGH VOLTAGE CIRCUIT BREAKER WITH COOLING

RELATED APPLICATIONS

This application claims priorities under 35 U.S.C. §119 to European Application No. 04405704.0 filed Nov. 16, 2004, designating the U.S., the entire contents of which is hereby incorporated by reference in its entirety.

TECHNICAL FIELD

The invention relates to the field of circuit breaker technology. It relates to a circuit breaker and to a method for cooling an inner conductor of a circuit breaker as claimed in the precharacterizing clause of the independent patent claims.

PRIOR ART

A circuit breaker such as this and a method such as this are known, for example, from EP 1 022 830 A1. In this document, fans are provided for cooling an inner conductor, which is in a housing, of a circuit breaker, by means of which fans a circular flow is produced which flows around the inner conductor. The gas which is circulated in this way absorbs heat losses from the inner conductor and then emits these heat losses to the inner face of the housing. The housing in turn emits heat to the surrounding air outside the housing. The cooling of the inner conductor means that greater currents can be carried.

An arrangement such as this has the disadvantage that it is active, that is to say it must be driven. A failure, for example of the power supply to the fans, leads to failure of the cooling and can quickly lead to the maximum permissible temperature limit values of the circuit breaker being exceeded. A cooling system such as this also requires regular maintenance in order to ensure correct operation of the fans.

DESCRIPTION OF THE INVENTION

One object of the invention is therefore to provide a circuit breaker and a method for cooling an inner conductor of a circuit breaker of the type mentioned initially, which do not have the disadvantages described above. One particular aim is to create a circuit breaker with a passive and (virtually) maintenance-free cooling system.

This object is achieved by an apparatus and a method having the features of the independent patent claims.

A circuit breaker whose inner conductor (which can also be referred to as the active part) is cooled can carry higher currents than an uncooled circuit breaker while complying with the temperature limit values specified by the relevant standards. The current carrying capacity of a circuit breaker can thus be increased to a greater extent the more efficiently a cooling apparatus which is provided can dissipate the heat losses which are produced on the inner conductor.

A circuit breaker according to the invention having an elongated inner conductor and an outer conductor (which can also be referred to as passive part or return conductor) which surrounds the inner conductor like a housing is characterized in that at least one heat pipe is provided in order to dissipate thermal energy (in general against all heat losses) from the inner conductor and has an insulating hollow body in order to form an electrical insulating gap. The heat pipe advantageously extends from the inner conductor to close to the outer conductor, as far as the outer conductor or, particularly advantageously, to outside the outer conductor.

A heat pipe is a means for dissipation of the heat by vaporization of a working medium in a section of the heat pipe which is referred to as an evaporator, and by condensation of the working medium in a section of the heat pipe which is referred to as a condenser, with means being provided for return of the working medium from the condenser to the evaporator. The heat pipe is advantageously hermetically sealed, thus making it possible to produce a closed circuit therein. An elongated or tubular heat pipe shape is advantageous, but it is not necessary. A hollow body can simply be used as the means for returning the working medium from the condenser to the evaporator, and can be arranged such that the liquid working medium is carried by gravitation, or else it is possible to use a material that transports the working medium back by means of capillary forces.

A heat pipe such as this with an insulating hollow body can bridge a potential difference, in particular a high voltage which is present between the inner conductor and the outer conductor. The vaporization of a working medium which is provided in the heat pipe can thus take place at a different electrical potential than the condensation of the working medium.

A heat pipe is a passive cooling apparatus which requires no power supply or any other supply. As a cooling system with a hermetically sealed circuit, it generally requires no maintenance and can in general operate without maintenance for years and decades.

The heat pipe and the outer conductor need not necessarily touch. They are advantageously mechanically connected to one another, or are integrated in one another. For example, the outer conductor can advantageously support the condenser section of the heat pipe. The heat pipe and the outer conductor are, however, advantageously electrically connected to one another, in particular being grounded.

In general, the inner conductor is tubular or hollow-cylindrical. The outer conductor, which carries the return current, forms encapsulation, which is in general grounded. During operation, there is a high voltage between the inner conductor and the outer conductor.

The rated voltages of a circuit breaker are greater than 1 kV or, in fact, of the order of magnitude of 10 kV, or else they are several 10 kV up to several 100 kV. Overvoltages (caused by lightning strikes) are typically from 100 kV up to several 100 kV. Currents and return currents in circuit breakers are of the order of magnitude of 1 kA or 10 kA (rated current), and often 20 kA to 30 kA; the short-circuit currents are approximately one order of magnitude greater. A circuit breaker is designed for power levels of the order of magnitude of 100 kW or several 100 MW, or up to the Gigawatt range. Currents, voltages and power levels such as these necessitate a physical implementation of the circuit breaker and design symmetry of the circuit breaker which are not required, for example, for medium-voltage or low-voltage circuit breakers.

The heat to be dissipated is essentially produced by resistive losses in the inner conductor. Further losses can also occur, for example, such as those resulting from the skin effect, or eddy current losses and hysteresis losses.

The heat pipe advantageously contains a working medium for dissipation of the thermal energy by vaporization of the working medium in a section of the heat pipe which is referred to as an evaporator, and by condensation of the working medium in a section of the heat pipe which is referred to as a condenser, with the condenser being in close thermal contact with the outer conductor and/or having an apparatus for heat emission, and with the evaporator being in close thermal contact with the inner conductor.

The close thermal contact results in particularly efficient cooling. Passive cooling apparatuses can advantageously be used as apparatuses for heat emission. The heat is advantageously emitted to the surrounding air surrounding the outer conductor. For example, a cooling rib arrangement can be provided, which is attached to the outer conductor, or the outer wall of the heat pipe can form cooling ribs, for example by folding.

In one advantageous embodiment, the heat pipe has a flexibly deformable section. Vibration generally occurs in the circuit breaker during switching processes, resulting in relative movements between the inner conductor and the outer conductor. In order to avoid high mechanical loads on the heat pipe which, for example, could lead to leaks in the heat pipe, in particular in the area of the insulating hollow body, a means for mechanical decoupling, for example a bellows or an elastic section such as a piece of flexible tubing, can be provided as a flexibly deformable section. This means may at the same time also be a means for absorption of thermomechanical stresses (resulting from thermal expansion), or a separate means can also be provided for this purpose (likewise, for example, a bellows or an elastic section, such as a piece of flexible tubing). A means such as this and/or the means for mechanical decoupling can also be used to compensate for component and manufacturing tolerances.

In one advantageous embodiment, the heat pipe is in the form of a siphon. In the case of a heat pipe which is in the form of a thermal siphon, the condensed working medium is transported back (predominantly) by gravitation. The condenser is thus arranged higher (in the gravitation field) than the evaporator, and there must be a monotonal gradient along the heat pipe between them.

In a further advantageous embodiment, the heat pipe contains a means for feeding back condensed working medium to the evaporator by means of capillary forces. An embodiment such as this is preferably used when the condenser is arranged underneath the evaporator; however, it can also be used in conjunction with a thermal siphon. By way of example, porous materials which are electrically insulating can be used as the means for feeding back condensed working medium to the evaporator by means of capillary forces. Materials structured like a mesh and/or fabric-like materials are likewise suitable. Means such as these are preferably provided on the inner surface of the heat pipe.

In one advantageous embodiment, the evaporator is integrated in the inner conductor. For example, the inner conductor can be designed in such a way that it contains one or more volumes which represent a part of the heat pipe and are filled entirely or partially with working medium. This results in very good thermal coupling between the heat pipe and the inner conductor.

In a further advantageous embodiment, the circuit breaker has a supporting insulator in order to support the inner conductor, and one section of the heat pipe runs within the supporting insulator. A portion of the heat pipe is integrated in the supporting insulator, or is at least arranged in the supporting insulator. One advantage of this embodiment is that the heat pipe does not interfere with, or scarcely interferes with, the symmetry of the arrangement of the inner conductor and outer conductor. The supporting insulator is advantageously an electrically insulating mechanical connection between the inner conductor and outer conductor.

In one particularly advantageous embodiment, the heat pipe also contains an auxiliary gas, in addition to the working medium, in order to achieve an enhanced dielectric strength (of the insulating gap).

The heat pipe is advantageously designed in such a way that an electrical high voltage of up to $HV_{max}$ can be applied permanently across the insulating gap in a temperature range from $T_{min}$ to $T_{max}$ which can be measured at the evaporator, without this resulting in any breakdowns in the area of the insulating gap. The heat pipe contains a partial pressure of an auxiliary gas, which is not the same as the working medium, with the provision of the auxiliary gas resulting in no breakdowns occurring in the area of the insulating gap when the high voltage $HV_{max}$ is present across the insulating gap at the temperature $T_{min}$ while, in contrast, breakdowns occur in the area of the insulating gap when the auxiliary gas is not present but the high voltage $HV_{max}$ is present across the insulating gap at the temperature $T_{min}$.

In a different view, the invention can also be regarded as the provision of a heat pipe such as this with an auxiliary gas, in which case this heat pipe can also be used independently of a circuit breaker and for any desired other cooling purposes. For example, it can be used in any high-voltage appliance, for example in a transformer or in a high-voltage installation.

The dielectric strength of gases as a function of the pressure of the gas in general has a minimum, as is also manifested, by way of example, in the so-called Paschen curve as a minimum of the breakdown voltage. In the temperature range between about −40° C. and about +60° C. which is of particular interest for circuit breakers, the dielectric strength for typical working media and typical working gas pressures (100 mbar to 1000 mbar during cooling operation) for the lower temperatures (about −50° C. to −10° C.) is quite low, so that a relatively long insulating gap of, for example, 50 cm or more would be required. A shorter insulating gap would be desirable, in order to reduce the dimensions of the heat pipe.

The auxiliary gas which, for example, is at a partial pressure in the order of magnitude of 100 mbar to 500 mbar in the heat pipe allows a minimum pressure to be ensured even at low temperatures, and thus a corresponding dielectric strength in the heat pipe. The working liquid does not start to boil until that temperature at which its vapor pressure exceeds the auxiliary gas pressure.

In conjunction with the Paschen curve, this corresponds to a shift in the curve, and thus in the breakdown voltage minimum (as well) to the left, that is to say to low values of the (total) pressure times the insulating gap length. If the insulating gap length is constant, the circuit breaker can thus either have higher voltages applied to it by the provision of the (not infinitely low) partial pressure of auxiliary gas for the same temperature range $T_{min}$ to $T_{max}$ of the circuit breaker or, if the circuit breaker is designed for the same high voltages, can be used for a wider temperature range (with a lower $T_{min}$). Alternatively, a shorter insulating gap length can be provided for the same temperature range and the same voltages.

The auxiliary gas is advantageously gaseous over the entire temperature range $T_{min}$ to $T_{max}$. The auxiliary gas can thus dissipate only a very small amount of heat, and it is moved by the vaporizing working medium in the direction of the condenser. It is thus advantageously possible to provide an auxiliary gas holding volume at the condenser, which is essentially filled with the majority of the auxiliary gas, or with all of the auxiliary gas in operating conditions. This makes it possible to prevent the area which is available to the working medium for condensation from not being blocked or being blocked only to a minor extent by the auxiliary gas. Efficient cooling is achieved. The auxiliary gas holding volume may be rigid (constant volume content). The volume content of the auxiliary gas holding volume is advantageously variable, and increases with the temperature and the internal pressure in the heat pipe. An auxiliary gas holding volume such as this is advantageously designed to be deformable (for example in the form of a bellows) and, for example, is formed from a deformable material.

The partial pressure of the auxiliary gas is advantageously chosen such that, in operating conditions (typically at $T_{max}$), the (total) internal pressure of the heat pipe corresponds to the external pressure (just) surrounding the heat pipe, that is to say typically being about 1 bar (1000 mbar plus/minus 100 mbar to 250 mbar) or advantageously virtually 1 bar. It is also possible to provide lower or, advantageously, higher pressures within the heat pipe. Two or more bar or else a plurality of tens of bar, for example using ammonium as the working medium, can, for example, make up for the necessary design complexity (pressure sealing) by making it possible to provide a shorter insulating gap.

The inner conductor can advantageously have a plurality of sections which are each provided with at least one heat pipe. Particularly in the case of very long circuit breakers with long inner conductors, very efficient cooling is possible by associating in each case at least one heat pipe with a plurality of sections of the circuit breaker, which are arranged one behind the other in the longitudinal direction, along the longitudinal extent of the inner conductor.

A circuit breaker according to the invention advantageously has a plurality of switch poles, each having an inner conductor and each having an outer conductor, and each having at least one heat pipe.

In one preferred embodiment, the circuit breaker is a generator circuit breaker.

The method according to the invention for cooling an elongated inner conductor, which is surrounded by an outer conductor like a housing, of a circuit breaker is characterized in that a working medium is vaporized by absorption of thermal energy (in general, in particular, heat losses) from the inner conductor, and is condensed with heat being emitted, with the vaporization and condensation taking place at different electrical potentials.

Further preferred embodiments and advantages will become evident from the dependent patent claims and from the figures.

BRIEF DESCRIPTION OF THE DRAWINGS

The subject matter of the invention will be explained in more detail in the following text with reference to preferred exemplary embodiments which are illustrated in the attached drawings, in which, schematically.

Figure 1:
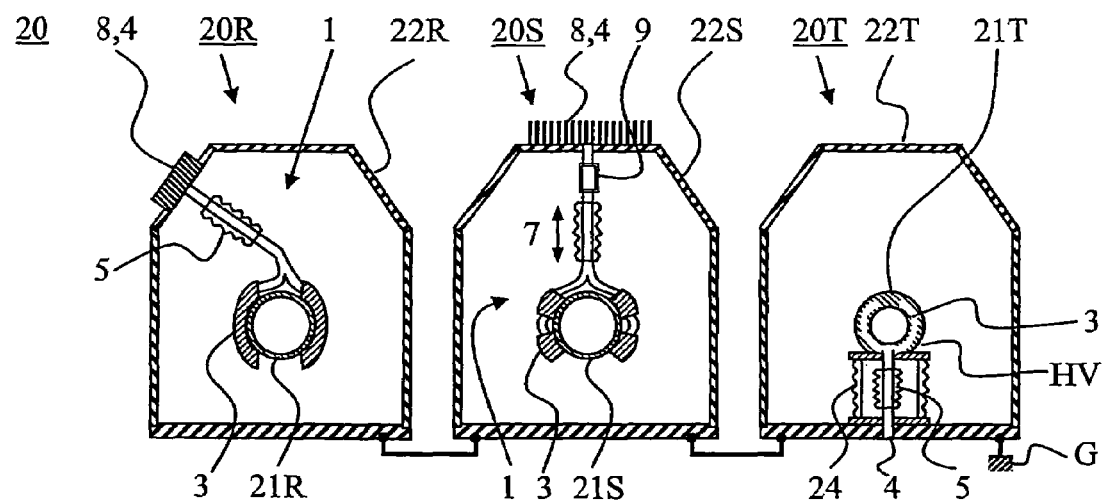
FIG. 1 shows a three-pole generator circuit breaker, illustrating three different types of arrangement of the heat pipe, in the form of a section.

The reference symbols used in the drawings and their meanings are listed in summary form in the list of reference symbols. Fundamentally, identical parts or parts having the same effect are provided with the same reference symbols in the figures. Parts which are not essential to understanding the invention are in some cases not illustrated. The described exemplary embodiments represent examples of the subject matter of the invention, and have no restrictive effect.

APPROACHES TO IMPLEMENTATION OF THE INVENTION

FIG. 1 shows, schematically and in the form of a section, a three-pole generator circuit breaker. Each of the switch poles 20R, 20S, 20T has a tubular inner conductor 21R, 21S, 21T, which is surrounded by a respective housing-like outer conductor 22R, 22S, 22T. During operation, a high voltage HV is present between the inner conductor and the respective outer conductor, with the outer conductor being at ground potential G and carrying the return current. In general, in contrast to the situation illustrated in FIG. 1, the three poles are grounded at a common star point. Since the inner conductor is housed and in general has a smaller cross section than the outer conductor, heat losses that need to be dissipated are produced on the inner conductor, while the outer conductor, which is subject to the surrounding air, is heated to a relatively minor extent.

Each of the inner conductors 21R, 21S, 21T is cooled by means of (at least) one heat pipe 1 in order to dissipate the heat losses from the inner conductor. Each pole of a circuit breaker is typically cooled by means of a heat pipe 1 which is arranged and designed in a similar form; however, FIG. 1 shows a different heat pipe arrangement in each pole. Each heat pipe 1 contains a working medium which is vaporized in a section of the heat pipe 1 which is referred to as an evaporator 3, and is condensed in a section of the heat pipe 1 which is referred to as a condenser 4.

R-Pole (on the Left in FIG. 1):

The evaporator 3 has two metallic elements (for example composed of aluminum) which are essentially in the form of hollow-cylindrical segments and whose shape is matched to the shape of the inner conductor 21R, and which are attached to the inner conductor 21R, in good thermal contact with it. These elements are in the form of hollow bodies and are filled with predominantly liquid working medium. The hollow bodies are connected to one another by means of preferably metallic tubes, which are part of the heat pipe 1.

In the rest of the profile of the heat pipe, it has an insulating hollow body 5 which is used for electrical isolation between the evaporator 3 and the condenser 4. The insulating hollow body 5 may, for example, be a glass tube (composed, for example, of borosilicate glass, with adjacent covar) and a ceramic tube (composed, for example, of $Al_2O_3$), which is connected in a gas-tight manner to the further parts of the heat pipe. As illustrated schematically in FIG. 1, the insulating hollow body 5 may have a shield, for example composed of silicone or ceramic. The insulating hollow body 5 forms an insulating gap 7 (illustrated for the S pole, in the center of FIG. 1). This must be able to withstand a rated voltage (typically about 10 kV to 40 kV), which is applied permanently to the circuit breaker, as well as a short-circuit voltage or lightning surge voltage (typically 100 kV or several 100 kV) which is applied briefly to the circuit breaker.

A further, preferably metallic, piece of tubing connects the insulating hollow body 5 to the condenser 4. The sequence of the arrangement of this metallic piece of tubing and the insulating hollow body 5 between the evaporator 3 and the condenser 4 may also be reversed. The connections between the insulating hollow body 5 and adjacent parts of the heat pipe 1 may, for example, be created by means of connection techniques (soldering) as are known from the production of vacuum interrupters. A junction such as this can also be provided by seals and flanges. In order to avoid field peaks in the vicinity of a junction such as this, a shielding electrode can be provided close to a junction such as this.

The condenser 4 has a preferably metallic cooling rib arrangement 8 which is mounted on a top incline of the outer conductor 21R and advantageously has a tube system (not illustrated) in which the gaseous working medium can propagate, in order to then be condensed in it and to flow back again to the evaporator 3. Parts of a tube system such as this are advantageously arranged in at least some of the cooling ribs.

The cooling rib arrangement 8 is in thermal contact with the outer conductor 22R and the surrounding air, thus allowing efficient dissipation of the heat. The cooling rib arrangement 8 could also be dispensed with; a thermal contact between the condenser 4 and the outer conductor 22R, and/or the attachment of the condenser 4 to the outer conductor could likewise be dispensed with. It is advantageous for at least a portion of the condenser to be arranged outside the outer conductor 22R. As an alternative to the cooling rib arrangement 8, other apparatuses could also be used for heat emission 8, for example heat exchangers. Forced cooling is also feasible in this case, for example by means of fans.

S Pole (in the Center of FIG. 1):

The evaporator 3 has two times two metallic elements which are essentially in the form of hollow-cylindrical segments and whose shape is matched to the shape of the inner conductor 21S, and which are attached to the inner conductor 21S, in good thermal contact with it. These elements are filled with predominantly liquid working medium and are connected to one another by means of preferably metallic tubes, which are part of the heat pipe 1. Planar flat sections may be provided on the outer conductor 22S, on which the elements are brought into contact with the inner conductor 21S, for example by screwing.

A flexibly deformable section 9 of the heat pipe 1 is also illustrated, schematically, and is formed, for example, by a bellows 9. The influence of mechanical vibration, such as that which occurs when the circuit breaker is connected or disconnected, on the heat pipe 1 can be reduced in this way. The mechanical load on the heat pipe 1 and in particular on the junction points between the insulating hollow body 5 and further parts of the heat pipe 1 can be greatly reduced in this way, thus contributing to the sealing and the life of the heat pipe 1. Metal-glass and metal-ceramic junctions are particularly sensitive to mechanical loads.

In the case of the S pole 20S, the condenser 4 is fitted to the top (cover) of the outer conductor 22S. A part of the outer conductor such as this is in general designed such that it can be moved/removed/pivoted in order to make the interior of the switch pole accessible, so that the heat pipe is advantageously designed in such a way that corresponding movement of the condenser with respect to the evaporator is possible, for example by means of at least one flexible connecting element. By way of example, it is also possible for the heat pipe to pass through a (fixed) wall of the outer conductor and nevertheless to be arranged on a moving part of the outer conductor (for example on a top which can advantageously pivot), in which case a flexible connecting element of the heat pipe then advantageously allows opening of the outer conductor by movement of the moving part, without opening the heat pipe.

In general, however, the condenser 4 will pass through the outer conductor and/or will be in contact with it preferably at a point which does not move with respect to the inner conductor during assembly or maintenance work.

Instead of the 2 and 4 elements illustrated on the left and in the center of FIG. 1, a heat pipe 1 may also have 1, 3, 5, 6, 7, 8 or more elements which absorb heat from the inner conductor 21.

T Pole (on the Right in FIG. 1):

In the T pole, the evaporator 3 is integrated in the inner conductor 21T in the form of preferably tubular volumes, which are provided within the inner conductor cross section. This provides very good thermal coupling between the inner conductor 21T and the evaporator 3. While, in the case of the R pole and in the case of the S pole, the condenser 4 is always arranged above the evaporator 3, so that the corresponding heat pipe 1 is in the form of a thermal siphon, the T pole illustrates the situation in which the condenser 4 is arranged underneath the evaporator 3. In this case, a means must be provided for feeding back condensed working medium to the evaporator. This can preferably operate by means of capillary forces. At least in the area of the insulating gap 7, the means for feeding back condensed working medium to the evaporator must be electrically insulating.

One section of the heat pipe 1 runs within a supporting insulator 24 which supports the inner conductor 21T. This makes it possible to avoid influencing the symmetry of the inner conductor/outer conductor arrangement, despite the installation of a heat pipe 1. The condenser 4 is provided in or on a bottom part of the outer conductor 22T.

Figure 2:
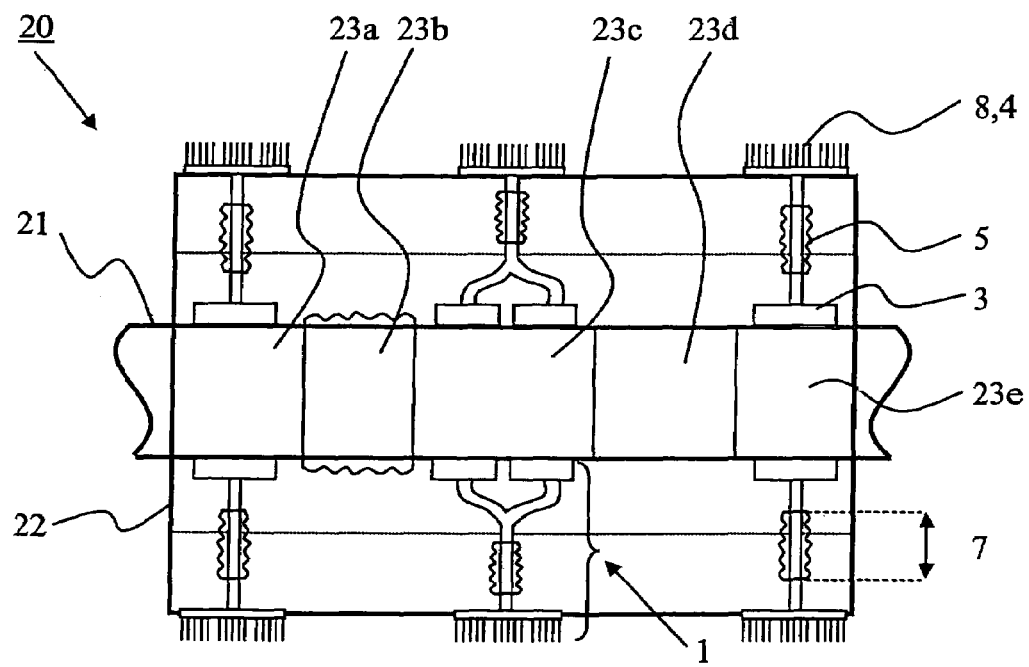
FIG. 2 shows a circuit breaker or switch pole, having an inner conductor which has a plurality of sections and having a plurality of heat pipes, predominantly sectioned, in a plan view.

FIG. 2 shows, schematically, a partially sectioned plan view of a circuit breaker or switch pole 20 which is designed in a similar way to the R pole shown in FIG. 1 (on the left). The inner conductor 21 has a plurality of sections 23a to 23e, a plurality (three) of which are provided with two heat pipes 1, which are arranged essentially symmetrically.

The section 23a is a connecting housing 23a which is used for connection of the circuit breaker 20 to the generator outgoer. The connecting housing 23a is cooled by means of two heat pipes 1, which have cooling ribs 8 on in each case one side wall of the outer conductor 22. The section 23b is a quenching chamber, which is used for contact disconnection and for arc quenching. This is followed by the drive housing 23c, in which a drive is arranged in order to allow contact disconnection in the quenching chamber 23b. The drive housing 23c is cooled by two heat pipes 1, each of which has two elements (hollow bodies) which are attached to the drive housing 23c and are in good thermal contact with it.

A moving isolator tube 23d is then provided on the drive housing 23c and is used to produce a visible insulating gap. This is followed by an isolator housing 23d which is used to accommodate the isolator tube. The isolator housing 23e is cooled in the same way as the connecting housing 23a.

Figure 3:
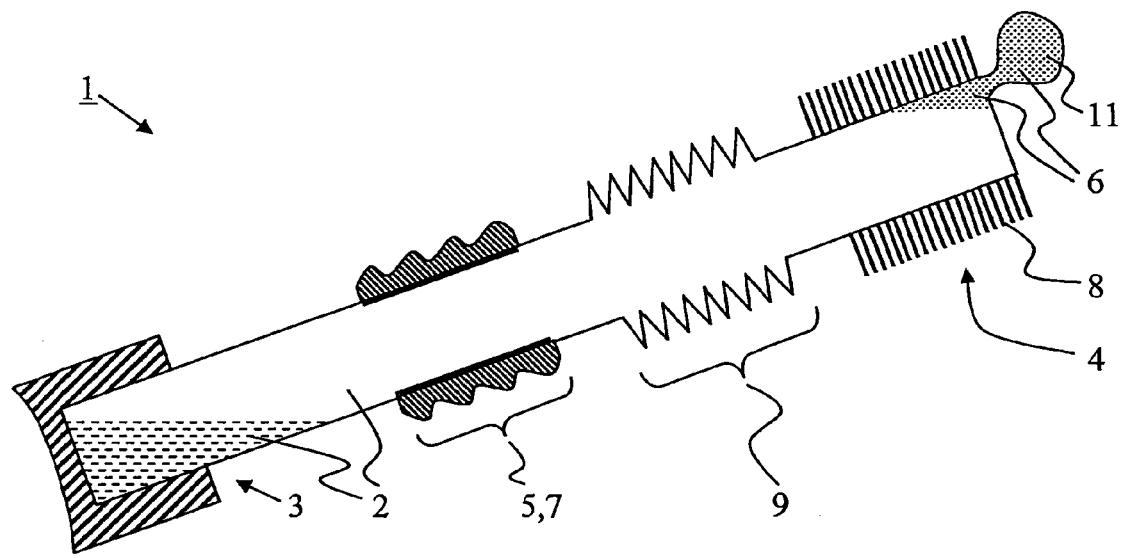
FIG. 3 shows a heat pipe with a flexibly deformable section, auxiliary gas and auxiliary gas holding volume.

A heat pipe 1 is illustrated schematically in FIG. 3 and is hermetically sealed so that a closed circuit is produced within the heat pipe, and no maintenance is required. The evaporator 3 contains an element which is used for thermal coupling to a body to be cooled (for example a circuit breaker inner conductor). The insulating hollow body 5, which is used to bridge any electrical potential difference and forms an insulating gap 7, is advantageously provided with a shield, as illustrated.

Furthermore, the heat pipe 1 illustrated in FIG. 3 has a flexible area 9 which is formed by a bellows. In consequence, those parts of the heat pipe 1 which extend on both sides of the area 9 can move relative to one another, so that excessive mechanical stresses, such as those which can occur in the event of vibration, are absorbed and do not lead to leaks in the heat pipe 1. The flexibly deformable section 9 of the heat pipe 1 may, for example, also be formed by a hollow body composed of elastic material. The condenser 4 of the heat pipe shown in FIG. 3 is provided with cooling ribs 8. The sequence of the arrangement of the flexibly deformable section 9 and the insulating hollow body 5 between the evaporator 3 and the condenser 4 can also be reversed.

A holding volume 11 is provided in the area of the condenser 4, whose volume can advantageously change in the event of pressure changes in the interior of the heat pipe 1. In addition to the working medium 2, there is also an auxiliary gas 6 in the heat pipe. The auxiliary gas 6 should be gaseous over the entire temperature range specified for the heat pipe 1. The advantages of an auxiliary gas 6 such as this will be explained further below in conjunction with FIG. 4.

Since the auxiliary gas can contribute only very slightly to cooling and is driven by the working gas 2, which vaporizes continuously (during a cooling process), in the direction of the condenser 4, the auxiliary gas 6 can block that surface in the condenser 4 which can be used for condensation of the working gas 2, thus reducing the cooling power of the heat pipe 1. If, as is illustrated in FIG. 3, an apparatus 8 is provided for heat emission, this should also be able to make thermal contact that is as good as possible over as large an area as possible with the working gas 2. In consequence, the holding volume 11 is provided in order to accommodate auxiliary gas 6. In the optimum case, the holding volume 11 should contain all of the auxiliary gas 6 and virtually no working gas during typical cooling processes (typical thermal powers to be dissipated). This means that the entire internal area of the heat pipe 1, which is provided with cooling ribs 8, is always available to the working gas 2 for condensation, and the working gas 2 does not condense at all, or condenses scarcely at all, within the holding volume 11.

Figure 4:
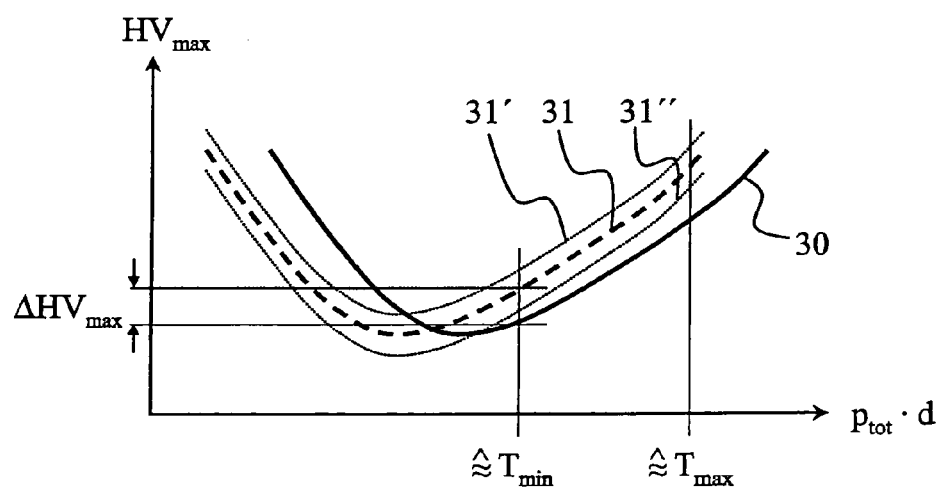
FIG. 4 shows Paschen curves for working medium with and without auxiliary gas.

Reference will be made to FIG. 4 in order to explain the purpose of the auxiliary gas 6. The curve 30 shown by a bold solid line in FIG. 4 schematically represents a Paschen curve for the situation in which only working gas 2 and no auxiliary gas 6 is present in the heat pipe 1. $p_{tot} \cdot d$ is plotted on the x axis, where $P_{tot}$ is the total pressure within the heat pipe 1, and d is the insulating gap length (distance between two bodies which are at different electrical potentials; in this case: essentially the length of the insulating hollow body 5). $HV_{max}$ is plotted on the y axis, with $HV_{max}$ being that high voltage at which an electrical breakdown occurs in the corresponding gas mixture at the corresponding pressure with the corresponding $p_{tot} \cdot d$ value and with the corresponding insulating gap length across which $HV_{max}$ is dropped. The Paschen curve has a minimum at which the dielectric strength of the gas mixture (in this case: working gas 2) is particularly low.

If the Paschen curve is related to the heat pipe 1, then the insulating gap length d is constant and, provided that there is no holding volume 11 or its volume content is essentially constant, the pressure is linked by a continuous function with the temperature of the gaseous working medium 2 close to the evaporator 3 (the vapor pressure of the working medium rises as the temperature rises). Temperatures $T_{min}$ and $T_{max}$ which correspond approximately to specific $p_{tot} \cdot d$ values can therefore be plotted on the x axis, indicated in the minimum and maximum operating temperature of the heat pipe 1, corresponding to the minimum and maximum gas temperature of the working medium 2 close to the evaporator 3. The operating temperature range for which a heat pipe 1 can be designed can be predetermined by predetermining this temperature range in the specific application. For example, for an application in a typical circuit breaker, for example a generator circuit breaker, a range with $T_{min}=-40°$ C. and $T_{max}=+60°$ C. or $T_{min}=-25°$ C. and $T_{max}=+60°$ C. is possible.

For typical working media, the temperature range is located to the right of the Paschen curve minimum, with $T_{min}$ being relatively close to the minimum. Thus, as is also illustrated in FIG. 4, this results in a relatively low $HV_{max}$. This means that either only small voltages HV can be applied to the insulating gap, or the length of the insulating gap must be chosen to be large. The gas pressure of the working medium 2 in the closed system of the heat pipe 1 is governed solely by the temperature. In circuit breaker applications, the voltage HV which may be dropped across the insulating gap 7 without breakdowns is in general predetermined, and the insulating gap length d is advantageously relatively small, particularly if the distance between the inner conductor and the outer conductor is small. A short insulating gap length d has the advantages that the physical size of the heat pipe is smaller and that a correspondingly short insulating hollow body in general has better mechanical characteristics.

The inventive option of nevertheless providing improved dielectric strength for the heat pipe 1 comprises the additional provision of an auxiliary gas 6, which is not the same as the working medium 2, in the heat pipe 1, as well as the working medium 2 itself. A specific minimum pressure and thus a predeterminable minimum dielectric strength can thus be predetermined for low temperatures and for correspondingly low pressures of the working medium 2. In the Paschen curve representation, this is illustrated to a first approximation as a shift to the left of the Paschen curve 30, thus resulting in the new Paschen curve 31, illustrated by a dashed bold line. Depending on which working medium 2 and which gas is used as the auxiliary gas 6, the new Paschen curve has a somewhat different shape and is shifted somewhat upwards or downwards (see, by way of example, the Paschen curves 31' and 31" in FIG. 4).

FIG. 4 shows that, when the curve 31 is the relevant curve for the working medium/auxiliary gas mixture, a breakdown voltage which has been considerably increased by $\Delta HV_{max}$ is achieved by the addition of the auxiliary gas 6. The auxiliary gas 6 thus makes it possible to shorten the insulating gap 7, to widen the operating temperature range, and/or to increase the voltage which can be applied.

Suitable working media 2 are, for example, acetone, fluoridized hydrocarbons such as "FC-72" from the company 3M, or hydrofluoro ether such as "HFE-7100" from the company 3M. Suitable auxiliary gases 6 may, for example, be $SF_6$, air or nitrogen, or a gas mixture. Both the working medium and the auxiliary gas must be electrically insulating and must have a suitable dielectric strength. The electrical conductivity of the working medium 2 should typically be less than $1 \cdot 10^{-6}$ $(\Omega \cdot cm)^{-1}$, or at least less than $5 \cdot 10^{-6}$ $(\Omega \cdot cm)^{-1}$.

Typical auxiliary gas pressures are 100 mbar to 400 mbar. Typical insulating gap lengths 7 are approximately 50 mm to 400 mm. The thermal power which is dissipated by means of a heat pipe 1 is typically between 0.5 kW and 1.5 kW.

Figure 5:
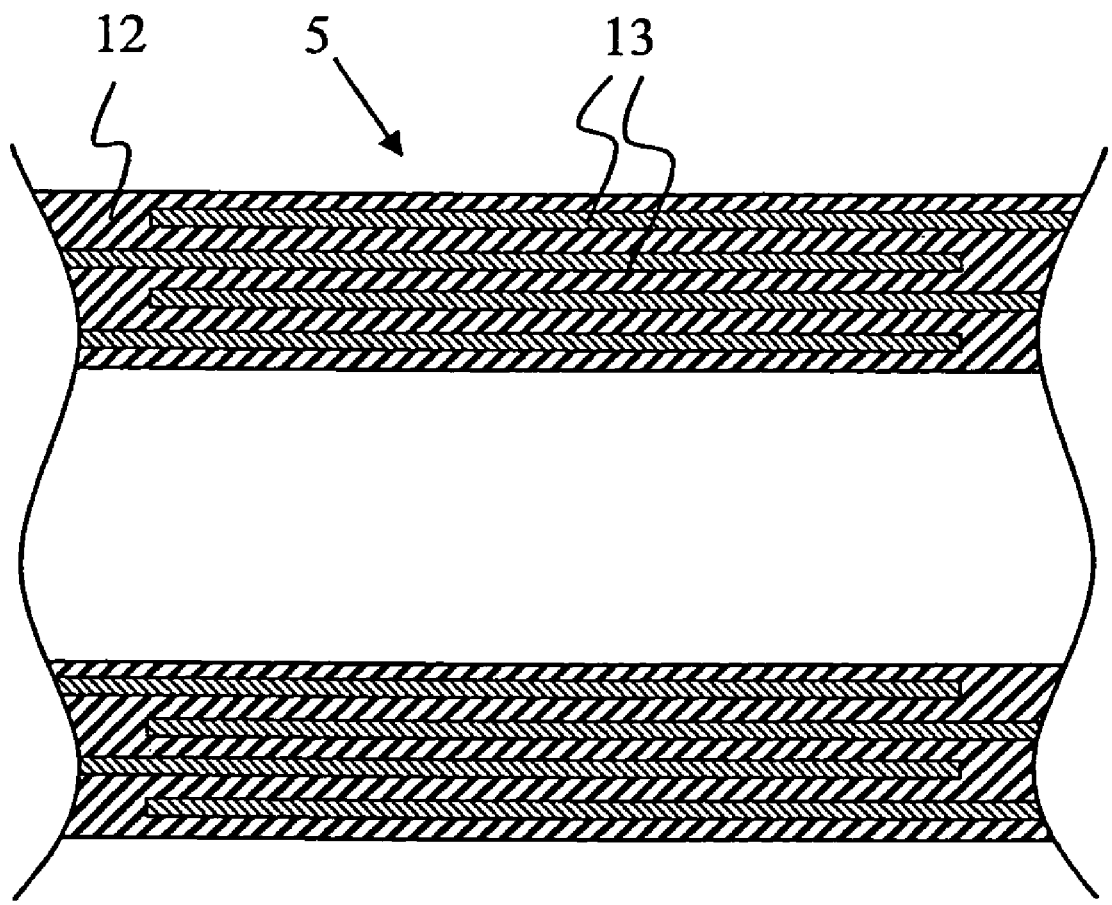
FIG. 5 shows one possible refinement of an insulating hollow body (detail), in the form of a section.

FIG. 5 shows schematically and in the form of a section a detail of one advantageous embodiment of an insulating hollow body 5. This insulating hollow body 5 is a tubular piece of insulating material 12, for example a glass-fiber-reinforced plastic, which is used as a carrier material 12 and in which diffusion inhibitors 13 are incorporated. The carrier tube 12 is electrically insulating and has a certain amount of mechanical flexibility. To this extent an insulating hollow body such as this which has been manufactured on the basis of a flexible material can also carry out the function of the flexible section 9 of the heat pipe 1, so that there is no need to provide any such separate section 9.

In the case of materials 12 such as these, diffusion inhibitors 13 are generally necessary or are at least advantageous, since typical working media 2 and auxiliary gases 6 could diffuse through them and/or air and/or water vapor could diffuse into the heat pipe, so that the heat transport characteristics of the heat pipe would change over time. The diffusion inhibitors 13 prevent molecules from diffusing out of the heat pipe (diffusion barrier; blocking of the diffusion). Metal layers 13 or metal foils 13 can advantageously be used as diffusion inhibitors 13, and are advantageously tubular. Polymers, for example in the form of films, can likewise be used as diffusion inhibitors 13. At least two or three, four, five, six or more such diffusion inhibitors 13 are introduced in a highly advantageous manner into the carrier tube 12, to be precise in such a manner that they provide very long diffusion paths for molecules which attempt to diffuse outwards through the insulating hollow body 5 from the interior of the heat pipe 1. For example, as is illustrated in FIG. 5, tubular diffusion inhibitors 13 which overlap one another to a large extent and have slightly different diameters can be used. Provided that the diffusion inhibitors 13 are electrically conductive, a minimum separation must be maintained between diffusion inhibitors 13 which are at different electrical potentials, in order to achieve a suitable dielectric strength. It may also be necessary to take into account the distance between the diffusion inhibitors and the ends of the insulating gap. By way of example, the innermost diffusion inhibitor tube 13 and the outermost diffusion inhibitor tube 13 can be connected to the high voltage HV or to ground potential G in the form of an electrical capacitor, while diffusion inhibitor tubes 13 located in between act as voltage dividers, so that only a fraction of the high voltage HV is dropped between two adjacent diffusion inhibitor tubes 13. Alternatively, for example, adjacent diffusion inhibitor tubes 13 may, however, also each be at ground potential or at the high-voltage potential that is present on the heat pipe.

A heat pipe may also have a plurality of hollow parts which are connected to one another, for example two hollow parts which are connected to one another in the form of a loop. By way of example, the vaporized working medium can flow to the condenser in one hollow part, while the condensed working medium flows back to the evaporator in another hollow part. In fact, a plurality of insulating hollow bodies would then have to be provided in the case of a heat pipe such as this.

| List of reference symbols | |
|---|---|
| 1 | Heat pipe |
| 2 | Working medium |
| 3 | Evaporator |
| 4 | Condenser |
| 5 | Insulating hollow body, glass tube, ceramic tube |
| 6 | Auxiliary gas |
| 7 | Insulating gap |
| 8 | Apparatus for heat emission, heat exchanger, cooling rib arrangement, radiator |
| 9 | Flexibly deformable section of the heat pipe |
| 10 | Means for feeding back condensed working medium to the evaporator by means of capillary forces |
| 11 | Holding volume for auxiliary gas |
| 12 | Carrier material, carrier tube, glass-fiber-reinforced plastic |
| 13 | Diffusion inhibitor, metal foil, metal cylinder |
| 20 | Circuit breaker, switch pole, generator circuit breaker |
| 20R, 20S, 20T | Switch pole |
| 21 | Inner conductor, tubular conductor |
| 21R, 21S, 21T | Inner conductor |
| 22 | Outer conductor, encapsulation, housing |
| 22R, 22S, 22T | Outer conductor |
| 23 | Section of the inner conductor |
| 23a | Connecting housing |
| 23b | Quenching chamber |
| 23c | Drive housing |
| 23d | Moving isolator tube |
| 23e | Isolator housing |
| 24 | Supporting insulator |
| 30 | Paschen curve for working medium without auxiliary gas |
| 31, 31', 31" | Paschen curve for working medium with auxiliary gas |
| d | Insulating gap length, distance between two bodies which are at different electrical potentials |
| G | Ground potential |
| HV | High voltage |
| $HV_{max}$ | High voltage |
| p | Partial pressure of auxiliary gas |
| $p_{tot}$ | Total pressure |
| $T_{min}$ | Temperature |
| $T_{max}$ | Temperature |

The invention claimed is:

1. A circuit breaker having an elongated inner conductor and an outer conductor which surrounds the inner conductor like a housing,
wherein
at least one heat pipe is provided in order to dissipate thermal energy from the inner conductor, extends from the inner conductor to the outer conductor, and has an insulating hollow body in order to form an electrical insulating gap,
the heat pipe contains a working medium for dissipation of the thermal energy by vaporization of the working medium in a section of the heat pipe which is referred to as an evaporator, and by condensation of the working medium in a section of the heat pipe which is referred to as a condenser,
the condenser is in close thermal contact with the outer conductor and/or has an apparatus for heat emission,
the evaporator is in close thermal contact with the inner conductor, and the heat pipe also contains an auxiliary gas, in addition to the working medium, in order to increase a dielectric strength of the insulating gap.

2. The circuit breaker as claimed in claim 1, wherein the heat pipe extends to outside of the outer conductor.

3. The circuit breaker as claimed in claim 1, wherein the heat pipe has a flexibly deformable section.

4. The circuit breaker as claimed in claim 1, wherein the heat pipe is in a form of a thermal siphon.

5. The circuit breaker as claimed in claim 1, wherein the heat pipe contains means for feeding back condensed working medium to the evaporator by means of capillary forces.

6. The circuit breaker as claimed in claim 1, wherein the evaporator is integrated in the inner conductor.

7. The circuit breaker as claimed in claim 1, wherein the circuit breaker has a supporting insulator in order to support the inner conductor, and wherein one section of the heat pipe runs within the supporting insulator.

8. The circuit breaker as claimed in claim 1, wherein the heat pipe is designed in such a way that an electrical high voltage (HV) of up to $HV_{max}$ can be applied permanently across the insulating gap in a temperature range from $T_{min}$ to $T_{max}$ which can be measured at the evaporator, without this resulting in any breakdowns in the area of the insulating gap, wherein the heat pipe contains a partial pressure (p) of an auxiliary gas, which is not the same as the working medium, with the provision of the auxiliary gas resulting in no breakdowns occurring in the area of the insulating gap when the high voltage $HV_{max}$ is present across the insulating gap at the temperature $T_{min}$ while, in contrast, breakdowns occur in the area of the insulating gap when the auxiliary gas is not present but the high voltage $HV_{max}$ is present across the insulating gap at the temperature $T_{min}$.

9. The circuit breaker as claimed in claim 1, wherein the inner conductor has a plurality of sections which are each provided with at least one heat pipe.

10. The circuit breaker as claimed in claim 1, wherein the circuit breaker has a plurality of switch poles, each having an inner conductor and each having an outer conductor, and each having at least one heat pipe.

11. The circuit breaker as claimed in claim 1, wherein the circuit breaker is a generator circuit breaker.

12. The circuit breaker as claimed in claim 2, wherein the heat pipe has a flexibly deformable section.

13. The circuit breaker as claimed in claim 2, wherein the heat pipe is in a form of a thermal siphon.

14. The circuit breaker as claimed in claim 3, wherein the heat pipe is in a form of a thermal siphon.

15. The circuit breaker as claimed in claim 1, wherein the auxiliary gas is gaseous over the entire temperature range $T_{min}$ to $T_{max}$ specified for the heat pipe.

16. The circuit breaker as claimed in claim 1, wherein the working medium is acetone, fluoridized hydrocarbon, or hydrofluoro ether.

17. The circuit breaker as claimed in claim 1, wherein the auxiliary gas is $SF_6$ air or nitrogen, or a gas mixture.

18. The circuit breaker as claimed in claim 1, wherein an auxiliary gas holding volume is provided at the condenser, which is variable and increases with the temperature and the internal pressure in the heat pipe.

19. The circuit breaker as claimed in claim 1, wherein the hollow insulating hollow body is a glass tube or a ceramic tube.

20. The circuit breaker as claimed in claim 1, wherein the hollow insulating hollow body has a shield composed of silicone or ceramic.

21. The circuit breaker as claimed in claim 1, wherein the hollow insulating hollow body is a tubular piece of insulating material which serves as a carrier material in which diffusion inhibitors are incorporated.

22. The circuit breaker as claimed in claim 1, wherein the insulating body is manufactured from a flexible material and functions as a flexible section of the heat pipe.

23. A method for cooling in a high voltage appliance of an elongated inner conductor, which is surrounded by an outer conductor like a housing, wherein at least one heat pipe is provided in order to dissipate thermal energy from the inner conductor, extends from the inner conductor to the outer conductor, and has an insulating hollow body in order to form an electrical insulating gap, a working medium is vaporized by an absorption of thermal energy from the inner conductor, and is condensed with heat being emitted, with the vaporization and condensation taking place at different electrical potentials, wherein further the heat pipe also contains an auxiliary gas, in addition to the working medium, in order to increase the dielectric strength of the insulating gap.

24. A circuit breaker having an elongated inner conductor and an outer conductor which surrounds the inner conductor like a housing, wherein at least one heat pipe is provided in order to dissipate thermal energy from the inner conductor, extends from the inner conductor to the outer conductor, and has an insulating hollow body in order to form an electrical insulating gap, the heat pipe contains a working medium for dissipation of the thermal energy by vaporization of the working medium in a section of the heat pipe which is referred to as an evaporator, and by condensation of the working medium in a section of the heat pipe which is referred to as a condenser, the condenser is in close thermal contact with the outer conductor and/or has an apparatus for heat emission, the evaporator is in close thermal contact with the inner conductor, and the heat pipe has a flexibly deformable section arranged in the heat pipe between the evaporator and the condenser in order to avoid high mechanical loads on the heat pipe.

25. The circuit breaker as claimed in claim 24, wherein the insulating hollow body is manufactured from a flexible material and functions as the flexibly deformable section of the heat pipe.

26. The circuit breaker as claimed in claim 24, wherein the heat pipe extends to outside of the outer conductor.

27. The circuit breaker as claimed in claim 24, wherein the at least one heat pipe is in a form of a thermal siphon.

28. A circuit breaker having an elongated inner conductor and an outer conductor which surrounds the inner conductor like a housing, wherein at least one heat pipe is provided in order to dissipate thermal energy from the inner conductor, extends from the inner conductor to the outer conductor, and has an insulating hollow body in order to form an electrical insulating gap, the heat pipe contains a working medium for dissipation of the thermal energy by vaporization of the working medium in a section of the heat pipe which is referred to as an evaporator, and by condensation of the working medium in a section of the heat pipe which is referred to as a condenser, the condenser is in close thermal contact with the outer conductor and/or has an apparatus for heat emission, the evaporator is in close thermal contact with the inner conductor, and the heat pipe is designed in such a way that an electrical high voltage (HV) of up to $HV_{max}$ can be applied permanently across the insulating gap in a temperature range from $T_{min}$ to $T_{max}$ which can be measured at the evaporator, without this resulting in any breakdowns in the area of the insulating gap, wherein the heat pipe contains a partial pressure (p) of an auxiliary gas, which is not the same as the working medium, with the provision of the auxiliary gas resulting in no breakdowns occurring in the area of the insulating gap when the high voltage $HV_{max}$ is present across the insulating gap at the temperature $T_{min}$ while, in contrast, breakdowns occur in the area of the insulating gap when the auxiliary gas is not present but the high voltage $HV_{max}$ is present across the insulating gap at the temperature $T_{min}$.

* * * * *